US009948536B2

(12) United States Patent
Shazly et al.

(10) Patent No.: US 9,948,536 B2
(45) Date of Patent: *Apr. 17, 2018

(54) REAL-TIME MONITORING AND CONTROL IN A MULTI-NODAL, MULTI-TIERED DISTRIBUTED SYSTEM

(71) Applicant: International Business Machines Corporation, Armonk, NY (US)

(72) Inventors: Hassan A. Shazly, Columbia, SC (US); Douglas A. Van Dyken, Anderson, SC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 165 days.

This patent is subject to a terminal disclaimer.

(21) Appl. No.: 15/137,239

(22) Filed: Apr. 25, 2016

(65) Prior Publication Data

US 2017/0187600 A1    Jun. 29, 2017

Related U.S. Application Data

(63) Continuation of application No. 14/981,077, filed on Dec. 28, 2015, now Pat. No. 9,391,848.

(51) Int. Cl.
| | | |
|---|---|---|
| G06F 15/173 | (2006.01) |
| H04L 12/26 | (2006.01) |
| H04L 12/911 | (2013.01) |
| H04L 29/06 | (2006.01) |
| G06F 11/30 | (2006.01) |
| H04L 12/24 | (2006.01) |

(52) U.S. Cl.
CPC .......... *H04L 43/0888* (2013.01); *G06F 11/30* (2013.01); *H04L 41/5009* (2013.01); *H04L 47/827* (2013.01); *H04L 63/20* (2013.01)

(58) Field of Classification Search
CPC ....... H04L 41/5009; H04L 63/20; G06F 11/30
See application file for complete search history.

(56) References Cited

U.S. PATENT DOCUMENTS

| | | |
|---|---|---|
| 8,260,907 B2 | 9/2012 | O'Sullivan |
| 2015/0032884 A1 | 1/2015 | Greifeneder et al. |

*Primary Examiner* — Kyung H Shin
(74) *Attorney, Agent, or Firm* — Weitzman Law Offices, LLC

(57) ABSTRACT

A method involves starting multiple nodes; executing production workloads, made up of transactions; running a Monitoring and Control Program (MCP) on each node, wherein at least one MCP acts as a controlling MCP; monitoring in real-time individual transaction execution, the monitoring involving collecting parametric information regarding execution of the transactions on a node and transaction basis, the parametric information including at least an identification of each specific transaction, each node involved in processing those specific transactions, and at least one timing value related to the processing of each specific transaction; generating a transaction table including the collected parametric information; identifying whether there is degraded performance within the computer system, based upon throughput per unit time for all individual transactions; and, when degraded performance is identified, running lower level analysis only for particular nodes and particular transactions associated with the degraded performance.

1 Claim, 9 Drawing Sheets

800

| TransID | NodeID | TimeStamp | Elapsed Time | CPU (msec) | Action | Network Time |
|---|---|---|---|---|---|---|
| Tran01 | Node01 | 10:21:00.501 |  | 5 | Client retrieval request |  |
| Tran01 | Node02 | 10:21:00.508 | 7 | 9 | webserver | 2 |
| Tran01 | Node03 | 10:21:00.519 | 11 | 4 | appserver | 2 |
| Tran01 | Node04 | 10:21:00.522 | 5 | 20 | archive | 1 |
| Tran01 | Node03 | 10:21:00.550 | 26 | 7 | appserver | 6 |
| Tran01 | Node02 | 10:21:00.561 | 11 | 8 | webserver | 4 |
| Tran01 | Node01 | 10:21:00.574 | 13 | 7 | Client receive response | 5 |
| Tran02 | Node01 | 10:21:00.501 |  | 26 | Batch load request |  |
| Tran02 | Node02 | 10:21:00.551 | 50 | 27 | appserver | 24 |
| Tran02 | Node03 | 10:21:00.581 | 30 | 20 | archive | 3 |
| Tran02 | Node01 | 10:21:00.603 | 22 | 5 | appserver | 2 |
| Tran03 | Node01 | 10:21:00.501 |  | 2 | Client logon request |  |
| Tran03 | Node02 | 10:21:00.504 | 3 | 3 | webserver | 1 |
| Tran03 | Node03 | 10:21:00.508 | 4 | 2 | appserver | 1 |
| Tran03 | Node12 | 10:21:00.512 | 4 | 7 | ldap server | 2 |
| Tran03 | Node17 | 10:21:00.524 | 12 | 2 | appserver | 5 |
| Tran03 | Node01 | 10:21:00.527 | 3 | 2 | Client receive response | 1 |

| TransID | NodeID | TimeStamp | Elapsed Time | CPU (msec) | Action | Network Time |
|---|---|---|---|---|---|---|
| Tran01 | Node01 | 10:21:00.501 | | 5 | Client retrieval request | |
| Tran02 | Node01 | 10:21:00.501 | | 26 | Batch load request | |
| Tran03 | Node01 | 10:21:00.501 | | 2 | Client logon request | |
| Tran03 | Node01 | 10:21:00.527 | 3 | 2 | Client receive response | 1 |
| Tran01 | Node01 | 10:21:00.574 | 13 | 7 | Client receive response | 5 |
| Tran02 | Node01 | 10:21:00.603 | 22 | 5 | appserver | 2 |
| Tran03 | Node02 | 10:21:00.504 | 3 | 3 | webserver | 1 |
| Tran01 | Node02 | 10:21:00.508 | 7 | 9 | webserver | 2 |
| Tran02 | Node02 | 10:21:00.551 | 50 | 27 | appserver | 24 |
| Tran01 | Node02 | 10:21:00.561 | 11 | 8 | webserver | 4 |
| Tran03 | Node03 | 10:21:00.508 | 4 | 2 | appserver | 1 |
| Tran01 | Node03 | 10:21:00.519 | 11 | 4 | appserver | 2 |
| Tran01 | Node03 | 10:21:00.550 | 26 | 7 | appserver | 6 |
| Tran02 | Node03 | 10:21:00.581 | 30 | 20 | archive | 3 |
| Tran01 | Node04 | 10:21:00.522 | 5 | 20 | archive | 1 |
| Tran03 | Node12 | 10:21:00.512 | 4 | 7 | ldap server | 2 |
| Tran03 | Node17 | 10:21:00.524 | 12 | 2 | appserver | 5 |

FIG. 9

REAL-TIME MONITORING AND CONTROL IN A MULTI-NODAL, MULTI-TIERED DISTRIBUTED SYSTEM

CROSS REFERENCE TO RELATED APPLICATIONS

This application is a continuation of U.S. patent application Ser. No. 14/981,077, filed Dec. 28, 2015, the entirety of which is incorporated herein by reference.

FIELD OF THE INVENTION

This disclosure relates generally to computer systems and, more particularly, to multi-node, multi-tiered distributed systems.

BACKGROUND

Over the years, computer systems and the associated applications they run have grown in both size and complexity. Historically computer applications were single tier (also referred to as "single node") applications in which all the data and the processing of the data occurred on a single computer system. In contrast, many modern applications run on multiple-tiers (also referred to as "multiple nodes") distributed across multiple computers.

The ability to create multi-nodal systems offers an organization great flexibility and scalability in application design and implementation.

However, regardless of the number of nodes, tiers, their location, technology, organization and persistence they must all function cooperatively in an optimal manner in order to both process the data properly and deliver the required level of performance, in terms of throughput and response time, to the users of the system.

The use of multi-node/multi-tier systems has also created technological challenges in terms of the ability to test and diagnose poor overall system performance, especially in cases where the poor performance is intermittent. This is because, if there is an intermittent drop in performance, the use of traditional monitoring methods will typically significantly degrade overall system performance to an unacceptable level.

Specifically, traditional approaches to address an intermittent drop in performance involve creating script files that run on the various tiers that comprise the application. The script files are then run on a continuous basis creating large quantities of output data or they are only invoked as a result of some triggering event. In either case, post processing attempts are then made to synchronize the output data across the multiple tiers by means of timestamps in the data.

Using either of these traditional approaches has disadvantageous.

The continuous running of the scripts approach, outputting all diagnostic data, all the time on all tiers on which the application runs, is prohibitive, especially in a production environment in which response times are critical. More particularly, when using this approach, there is often not enough available disk space to store the data generated, the performance of the system experiencing the problem is adversely impacted and degraded by the running of the script files, and, in any event, depending on the frequency of the event occurrence, most of the data collected by running the scripts is useless but nevertheless must be analyzed.

The triggering event approach to running the scripts is less detrimental in a production environment, since data is only output when an intermittent event that causes a degradation in performance occurs. Nevertheless, this approach has its own inadequacies. For example, in some cases, the triggering event may only occur after the event that caused the degradation in performance has already occurred, or while it is in-process. Thus the root cause of the performance problem may have already passed or terminated before the actual triggering event. In other cases, the triggering event may occur on a single node within the system and cause collection of data for that node, but the cause of the event may not have happened on that node. If this is the case, i.e., that node is not the cause of the triggering event, then the collected data will be of limited to no value, since the performance issue will actually have resulted from an event that occurred on some other node and this node will only have "noticed" the trigger because the effect of the real event has "trickled over" to the node where the trigger occurred.

Still further, neither approaches can take into account dynamically created nodes, nor can they truly account for the possibility that a transaction that causes the performance problem may be processed on any available node, so it may be difficult to replicate by re-running the transactions that were being processed shortly before or during the time of the degraded performance.

Adding to the complexity in diagnosing intermittent degraded performance issues is the trend towards ever larger systems, composed of hundreds or thousands of computing nodes, any of which may be involved in the processing that results in a performance issue.

In an effort to avoid having an effect on the production system while it is in use, another approach to diagnosing intermittent poor performance typically involves creating a separate test environment and attempting to replicate the conditions of the production environment and, through monitoring, identify the cause of the poor performance. This approach is likewise inadequate because, the test environment is not actually the production environment.

With any of the foregoing traditional approaches, locating, diagnosing and fixing the cause of the performance issue typically takes months or more, so it is extremely costly.

Thus, there is an ongoing technological problem that requires a better solution than the replicating test environment can provide.

SUMMARY

One aspect of this disclosure involves a method performed in a computer system including multiple communicatively interconnected computers and non-transient storage accessible by at least one of the computers, each of the computers including an operating system and at least one processor. The method involves: a) starting multiple nodes on one or more of the multiple communicatively interconnected computers, the nodes being defined by instructions encoded in the non-transient storage and executable by the processors; b) executing production workloads, made up of transactions, using the processors of the multiple communicatively interconnected computers; c) running a Monitoring and Control Program (MCP) on each node, each MCP being defined by instructions encoded in non-transient storage and executable by the processors of each node concurrently with the execution of the production workloads, wherein each MCP is communicatively interconnected to at least one other MCP and at least one of the MCPs acts as a controlling MCP; d) communicating, operating system-independent MCP control language commands to other MCPs using the controlling MCP to cause the other MCPs to monitor execution of each of the transactions of the production workloads, on a per-transaction basis, as they traverse nodes; e) monitoring in real-time, via each MCP, individual transaction execution, the monitoring involving collecting parametric information regarding the execution of the transactions across the nodes on a node and transaction basis, the parametric information comprising at least an identification of each specific transaction, each node involved in processing those specific transactions, and at least one timing value related to the processing of each specific transaction by involved nodes; f) generating a transaction table including the collected parametric information; g) storing the transaction table in the non-transient storage; h) identifying, from the parametric information in the transaction table, whether there is degraded performance within the computer system, based upon throughput per unit time for all individual transactions progressing across individual nodes within the computer system; and i) when degraded performance is identified, running, under MCP control, lower level analysis only for particular nodes and particular transactions associated with the degraded performance.

The foregoing and following outlines rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which:

FIG. 8 illustrates, in simplified form, an example of a portion of a transaction table that might be available from a monitor controller MCP; and FIG. 9, which illustrates the transaction table of FIG. 8 after it has been sorted by NodeID as the primary sort field and time as the secondary sort field.

DETAILED DESCRIPTION

Figure 1:
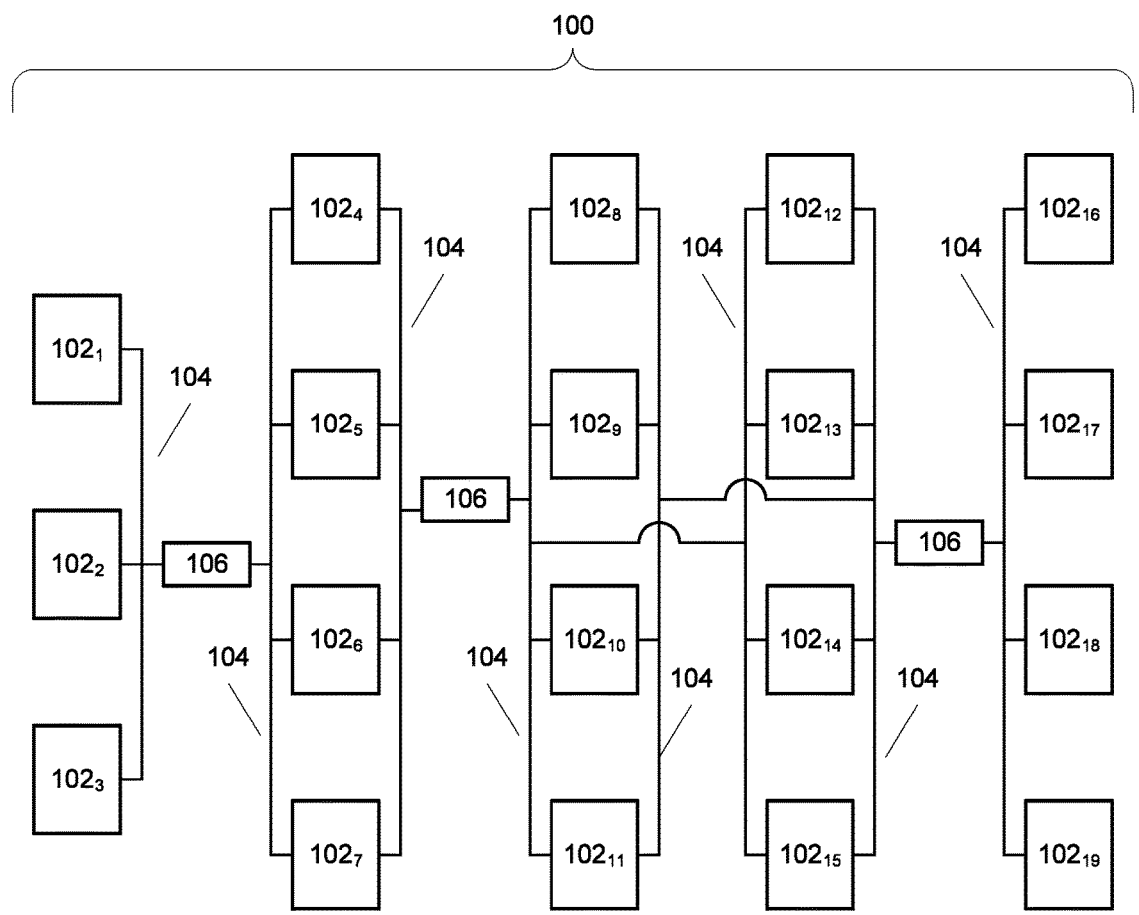
FIG. 1 illustrates, in simplified form, an example multinodal system 100 suitable for implementing our solution.

This disclosure provides a technical solution to address the aforementioned problems inherent with identifying and diagnosing the cause(s) of intermittent degraded performance occurring in a multi-node, multi-tiered distributed computer system environment. Our system and approach does not significantly degrade overall performance of the system or require the use of a test environment and replication. Our technical solution thereby improves upon current approaches and such multi-node, multi-tiered distributed systems by operating on the actual production system experiencing the intermittent degraded performance. Moreover, with our solution, in most cases, the diagnosis can occur in less than a few days, and in many cases, in a day or less, as opposed to months using current approaches, yielding a significant savings in time and cost. Thus, our solution represents a direct improvement to multi-node, multi-tiered distributed computer systems.

In connection with our solution, it is to be understood that, as used herein, the term "transaction" is intended to mean a single processing request of any type (e.g., store data, retrieve data, transmit, transform, process data or any other type of automated processing request). As such, a "transaction" may execute on one or more nodes, so a "transaction" as used herein is comprised of multiple "traditional" transactions (i.e., units of work that are treated as a whole in that they must be completed in full, or not at all). Moreover, it is to be understood that the route that a transaction as described herein may take through nodes of the system may or may not be known at the time the transaction is initiated.

Moreover, unless otherwise expressly stated otherwise, a reference herein to any "storage," "non-transient storage" or places where data structures, data-containing structures, commands and/or program instructions are stored, is to be interpreted as being storage that maintains such data structures, data-containing structures, commands and/or program instructions in a non-transitory manner, for example, as non-transient solid state memory, a magnetic hard drive, a tape drive, or an analogous or equivalent storage medium type would.

In simplified overview, our solution involves the monitoring and collection of transaction state. Specifically, our monitoring follows a transaction across all nodes it is involved with and dynamically adjusts the quantity/detail of diagnostic data collected on each node based on its performance. This is in sharp contrast to traditional techniques that rely on collecting the system state (for example, CPU and memory utilization) and/or the application state (which is collected from information provided by the application).

At the individual transaction level the important aspect of our transaction monitoring for which data is collected is the response/completion time, whereas at the group level the important aspect of our transaction monitoring is the throughput (i.e., number of transactions executed per unit of time). Where a transaction occurs across multiple (dynamically assigned and/or allocated) nodes, the transaction may begin on one node and proceed through multiple applications on multiple nodes, with, as noted above, the unit of analysis being the transaction, not the system(s) or application(s).

Advantageously, and in contrast to the traditional approaches, with our solution, data analysis being at the transactional level is deterministic, whereas the traditional approaches apply data analysis techniques that are statistical.

A further advantage is that our solution can be applied in any multi-node system, irrespective of whether implemented in a client-server model, a stream processing model, or a parallel processing model. In this regard, and for the remainder of the description, as used herein, the term "node" is intended to mean any type of computing system or any LPAR (logical partition) that may be involved in processing a transaction.

FIG. 1 illustrates, in simplified form, an example multi-nodal system 100 suitable for implementing our solution. Such multiple node systems can be implemented at a user's premises or in a cloud-based system. With such systems, data can be routed to any available node based on workload (or any other requirement), and additional nodes can be dynamically allocated to increase the overall processing capacity as or if needed.

As shown, the multi-nodal system 100 of FIG. 1 comprises multiple nodes $102_1$, $102_2$, $102_3$, $102_4$, $102_5$, $102_6$, $102_7$, $102_8$, $102_9$, $102_{10}$, $102_{11}$, $102_{12}$, $102_{13}$, $102_{14}$, $102_{15}$, $102_{16}$, $102_{17}$, $102_{18}$, $102_{19}$ (which may be persistent, transient or a combination of both) running on computers each communicatively connected to other nodes, either directly, for example over a bus 104, or via some interconnection element(s) 106, such as one or more switch(es) or router(s). The computers each have an operating system, although they may not all be the same across all of the computers (i.e., a heterogeneous operating system environment).

The nodes, such as shown in FIG. 1, are dynamically assigned work, with no a priori rule that dictates where the next portion of the transaction will be processed and in each processing step the data may be processed by a single node or processed by parallel nodes. Advantageously, our solution is agnostic to whether the processing of requests is unidirectional (flow only from source node to destination node(s)) or bidirectional (flow from source node to destination node(s) and back to the source node), whether the nodes are specialized (in that they can only service a particular type of transaction (or part thereof) or generalized to service one or more transactions of one or more types, whether the nodes are heterogeneous in terms of the physical computing equipment they run on or operating systems used by such equipment. Depending upon the particular system, an individual physical computer that is part of the system may have a single node running on it, or it may have multiple nodes running on it. Likewise, any individual computer may have a single processor running a single or multiple nodes or it may have multiple processors each running one or more nodes. In addition, such computers can include general purpose processors as well as special purpose processors, for example, graphics processors, math co-processors, analog and/or digital signal processors, etc. that participate in the processing of transactions.

In typical system implementations where our solution can be deployed, the system may be architected or configured such that it includes:
  i) one or more server nodes as the main access points to stored data,
  ii) zero or more mid-nodes designed to support web application access to the system,
  iii) zero or more client nodes, which may be thin clients, thick clients, or some combination of both.
  iv) zero or more specialized nodes to perform function such as data storage (SAN, NAS), data processing, data communications, data protection and encryption, cache storage systems, . . . , etc. Note however that these functions may or may not be partially or completely executed on any of the nodes described in "i)", "ii)" or "iii)" above.

All of the above nodes of the system are interconnected by means of one or more networks, which may be private or public networks running one or more communication protocols (such as TCP/IP, SNA, . . . , etc.)

Figure 2:
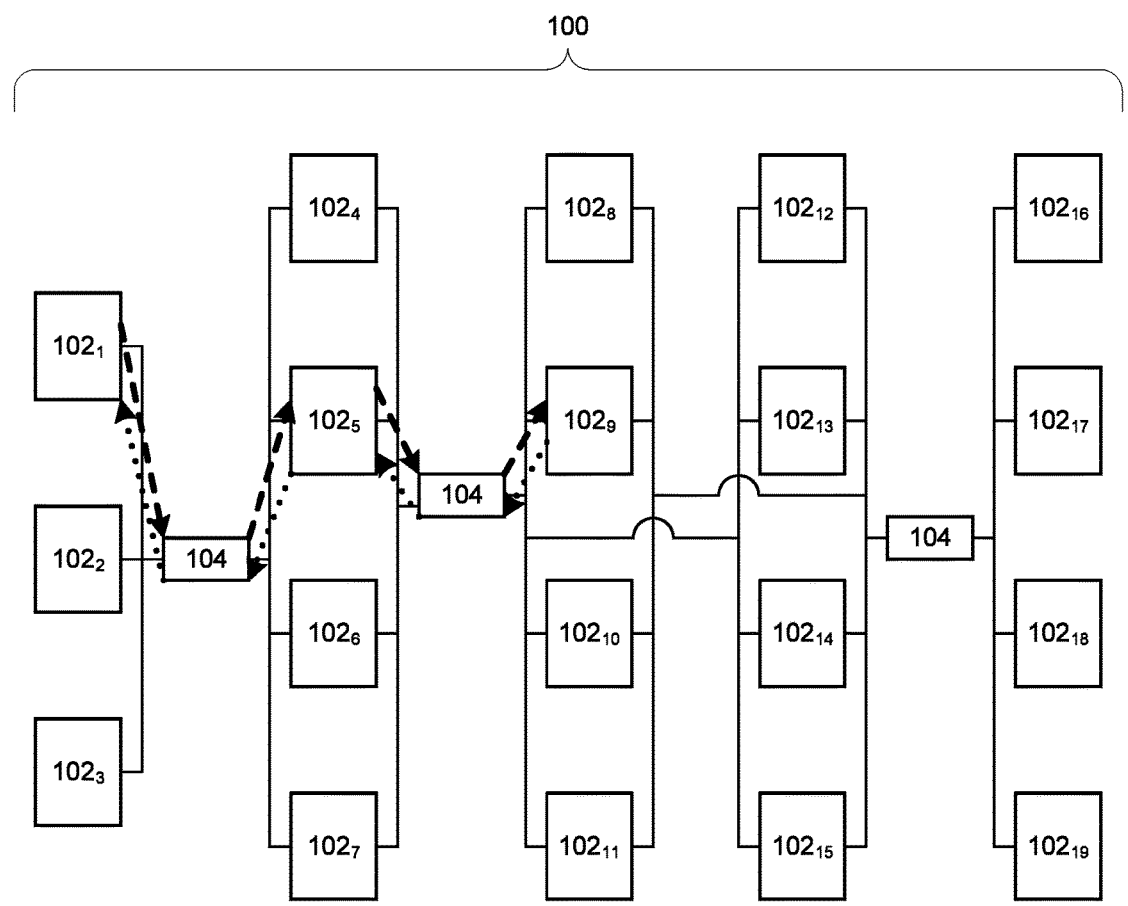
FIG. 2 illustrates, in simplified form, the example multinodal system of FIG. 1 involving transaction flow according to a client-server model.

FIG. 2 illustrates, in simplified form, the example multi-nodal system 100 of FIG. 1 involving transaction flow according to a client-server model.

With this model, data is processed on a single node. With a client-server model, a program, on a client requests a service or resource from another program on another node (i.e., the server). The server fulfills the request and returns the result to the client. The simple client server model can be extended into a multi-tier model, such as shown in FIG. 1, through a "daisy chaining" transactional process such that an originating client node $102_1$ places a request to a server $102_5$, which then acts as a client and places a request to another server $102_9$ (this can be repeated through multiple tiers) until the final server $102_9$ that will process the request is reached. This is shown in FIG. 2 by way of the bold dashed arrows. The final server $102_9$ then processes the request and the result is returned back through the multiple tiers (which may or may not be the same and may involve performance of intermediate processing at some intervening node(s)) until it reaches the original requestor node $102_1$, as shown by the bold dotted arrows.

Figure 3:
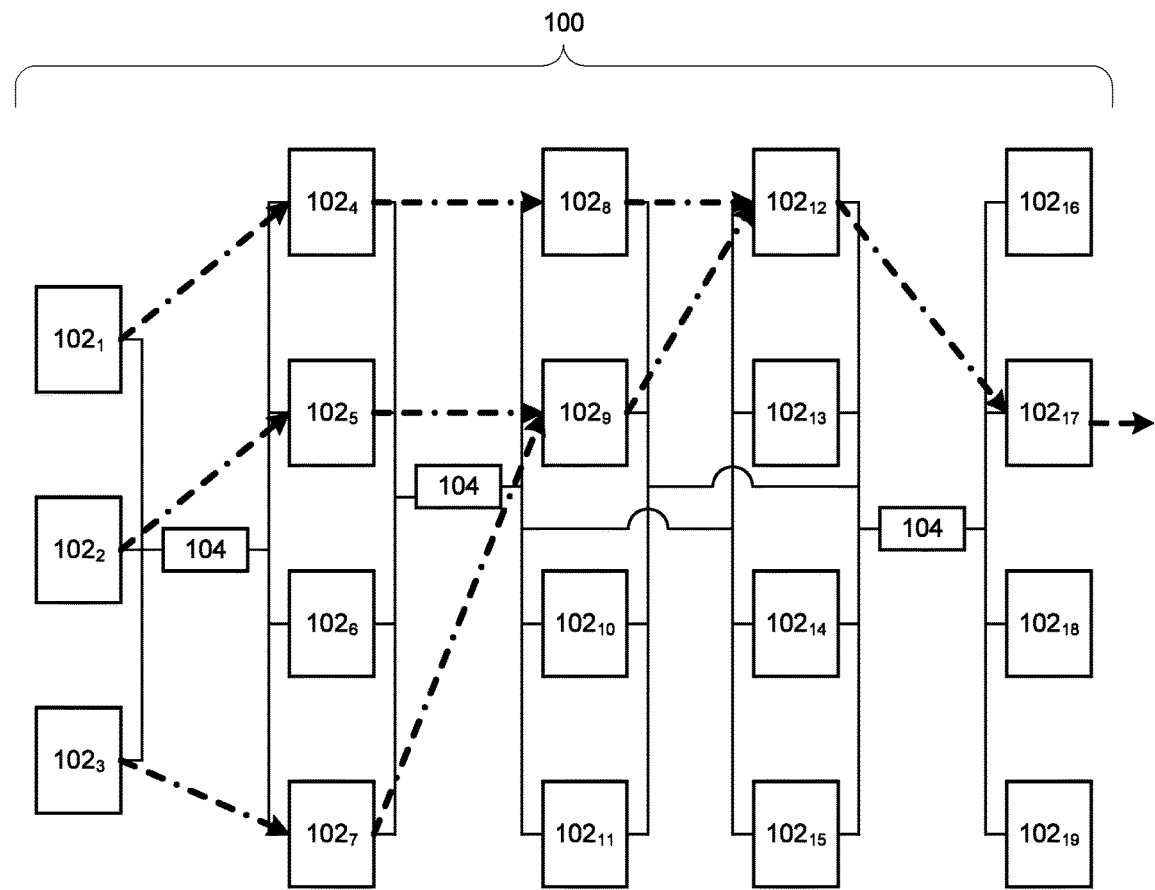
FIG. 3 illustrates, in simplified form, the example multinodal system of FIG. 1 involving transaction flow according to a stream processing model.

FIG. 3 illustrates, in simplified form, the example multi-nodal system 100 of FIG. 1 involving transaction flow according to a stream processing model.

With stream processing, data is processed and aggregated with other data, through one or more transactions, as it passes through an organized collection of multiple nodes as shown (without regard to the illustrated communication interconnections) in FIG. 3 using bold dot-dashed lines. Essentially the raw data flows as a group of transactions into one side of an array of nodes $102_1$, $102_2$, $102_3$ (the left side of FIG. 3), and is subsequently processed and aggregated as it flows through various nodes $102_4$, $102_5$, $102_7$, $102_8$, $102_9$, $102_{12}$ and out from one or more nodes $102_{17}$ on the other side (the right side of FIG. 3). One example of stream processing is "Infosphere Streams", which is commercially available from IBM Corp. and continuously integrates and analyzes data in motion to deliver real-time analytics.

Figure 4:
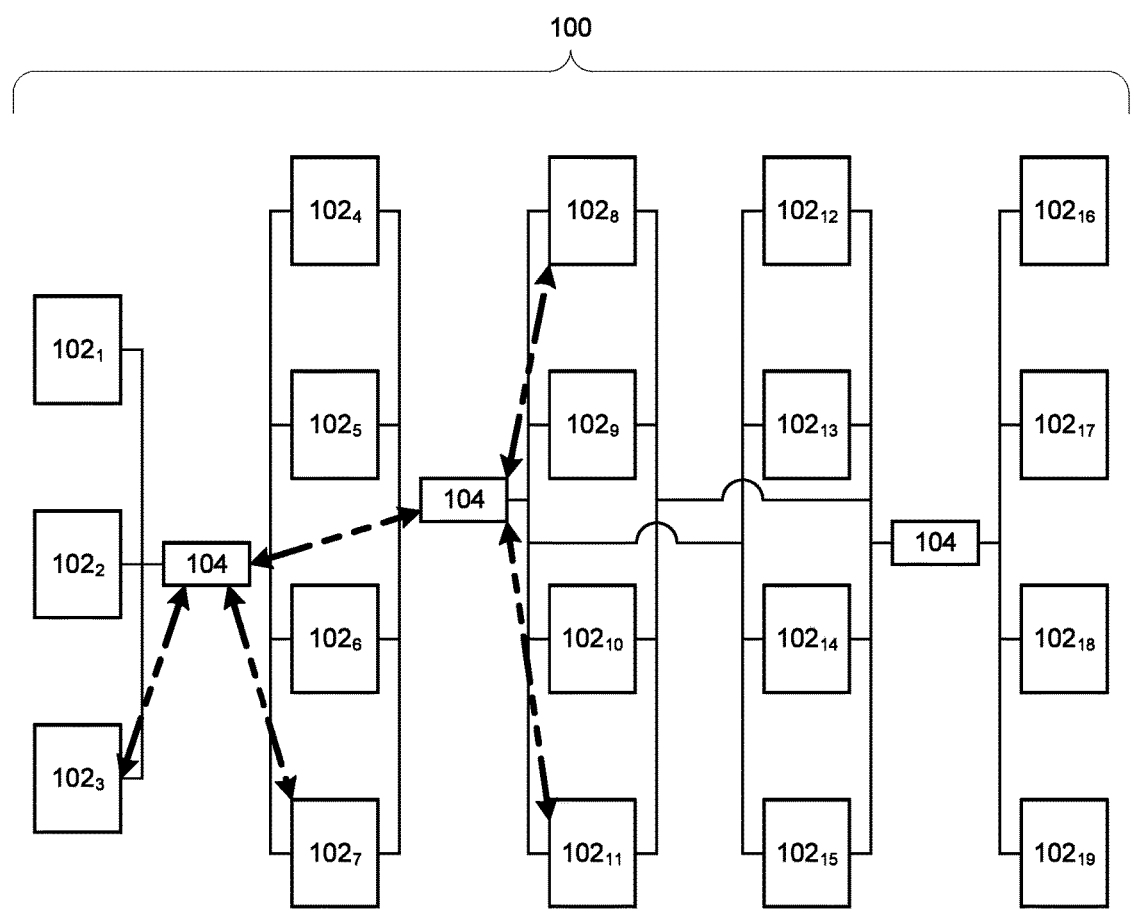
FIG. 4 illustrates, in simplified form, the example multinodal system of FIG. 1 involving transaction flow according to a parallel processing model.

FIG. 4 illustrates, in simplified form, the example multi-nodal system 100 of FIG. 1 involving transaction flow according to a parallel processing model.

With parallel processing, multiple nodes participate in solving a problem in parallel. As shown in FIG. 4 (using long-double short dashed lines and without regard to the illustrated communication interconnections), the dataset is split between the nodes $102_7$, $102_8$, $102_{11}$, as separate transactions for processing and the results from those nodes are returned to the originating node $102_3$ although, in some cases, specialized transactional processing may be performed on one or more "specialty" nodes.

In general, in systems implementing our solution, for each node, three types/levels of detail of diagnostic data are monitored or kept track of:
  1) Node status, for example, CPU utilization, disk I/O activity, etc.;
  2) Application status—the status of one or more applications that are executing within the system, for example, DB2 statistics such as the buffer pool hit ratio; and
  3) Transaction status—a record of each transaction as it flows through the system, for example, execution time of each transaction (at the transaction part level) as it flows through each node of the system.

Both the node status and the application status are tracked, on a per node basis, either interactively or in batch, continuously or intermittently. This can be implemented, for example, using available technology.

Representative example applications that can be used to track individual node status include, but are not limited to, applications in the Omegamon family (for z/OS, z/VM and Linux V4) commercially available from IBM Corp., IOSTAT (for UNIX and Unix-like operating systems (AIX, Solaris, Mac OSX, Linux, etc.)), VMSTAT (for UNIX and Unix-like operating systems (AIX, Solaris, Mac OSX, Linux, etc.)), to name a few.

Representative example applications that can be used to track application status include, but are not limited to, DB2 monitors, commercially available from numerous companies, and the "Enterprise Content Management System Monitor" commercially available from IBM Corp. to name a few.

Other applications that are capable of tracking individual node status or application status can be used, the important aspect being the tracking, not the particular application used to do so.

As will be described in greater detail below, at the single transaction level, our solution monitors the transaction time (often interchangeably referred to as "response time" depending on network topology) as the transaction progresses across nodes and through the system. If an individual transaction is detected to have exceeded the expected transaction/response time, or totally fails, then the "problem" node(s) are automatically identified and additional information can be gathered from the node(s). Alternatively, or additionally, with some implementations, monitoring within the multi-nodal system can be performed at the aggregate transaction level. By doing so, the throughput for all transactions per unit time can be obtained. If a combination of the throughput and response times start to show performance degradation, then the "problem" node(s) is automatically identified and additional information can be gathered from those node(s).

In either case, the automatic detailed collection of additional statistics, based on performance events, can drive additional data collection that includes the "status" of the transient portion of other transactions also running on any of the "problem" node(s) at the same time or collection of other appropriate system or application specific information. Advantageously, the additional data that is collected can be instrumental in determining root cause performance issues that were directly related to system or component failures identified by the data collection details.

Transaction status and performance monitoring involves the use of a Monitoring & Control Program (hereafter referred to as an "MCP") installed on each node. An MCP is implemented in program instructions, stored in non-transient storage accessible to the processor(s) of the node on which it is to run, and executable by the processor(s) of that node. The MCPs operate under control of an MCP control language (MCL) made up of operating system (OS) agnostic "macro" instructions (i.e., each MCL instruction (command) automatically causes a specific set of instructions to be run and thereby perform a particular task and the same MCL instruction can be sent to nodes that are running on different operating system). For example, a command "GetMem" could be issued by an MCP to all nodes in the system to have them report how much memory is being used by a given transaction on their node(s), even though some nodes are running on a Windows OS, others are running on a UNIX or Unix-like OS and still others are running on a different mainframe OS, for example z/OS, and each will execute the local command(s) appropriate for that OS to obtain the requested information. The MCL will be described in greater detail below.

Each MCP runs on, and performs the function of, a "node monitor" on its node and, as will be explained in greater detail below, any MCP can also, or alternatively, act as a "monitor controller" if necessary with respect to MCPs on other nodes performing their node monitor function. Additionally, as will be explained below, the MCPs are communicatively interconnect-able with each other in a cluster configuration.

An MCP acting as a node monitor monitors and collects performance data for its node. This data is periodically sent to the MCP acting as a monitor controller. The node monitors also perform additional tasks based on command(s) received from the MCP acting as the monitor controller.

The MCP that will perform the monitor controller function can be installed on any node within the existing application or can be installed on a separate node, either on its own network or on one of the other networks that are already part of the multi-nodal application. The monitor controller MCP receives performance data from all of the MCPs of the nodes that comprise the application. It analyzes the data it receives and generates an overall picture of the performance of the application. If any degradation is detected in any node within the application, then the monitor controller MCP will issue commands to the MCPs on the nodes in the system to, for example, collect data more frequently, in more detail or of a specific type.

The result of the effort of the monitor controller MCP and node monitor MCPs is the creation of a list or array of all the transactions that are/were executed in real time (referred to herein a "transaction array"). This transaction array can then be: monitored in real time, used to autonomically trigger real time responses to system resource shortages, and/or saved or discarded on a regular basis depending on the overall system requirements.

MCP Details

Individually each MCP is constructed as program code, in the form of a static library, runtime library, or executable (depending upon the particular implementation), and is started at system boot time and can issue MCL commands to other MCPs, and responds to MCL commands it receives from one or more other MCP(s), through programming generally stored, in storage associated with its local node, in text files (also referred to herein as "script files").

Its functionality is controlled, can be modified, and can be expanded, based on the content of the script file(s) on its node, which can be modified or expanded as needed.

Specifically, some basic actions are built into the initial MCP. However, these actions can be extended or added to by means of script files that can be dynamically downloaded and then locally stored on the node.

The script files determine the extended action(s) to be taken by an MCP when an appropriate MCL command is received, which can include, for example, that it i) monitor the system that it is running on;
ii) invoke certain code and observe/interpret the outcomes of the code invocation;
iii) detect incoming and outgoing TCP connections
iv) request services from one or more other MCPs; and/or
v) act as a monitor controller.

In addition, through use of the MCL commands, two or more MCPs can coordinate their activities, thereby creating what we call an "MCP cluster." Advantageously, MCP clusters can be statically or dynamically created, and coordination of the MCP cluster activity can be centralized or de-centralized, but under the coordinating control of MCP acting according to its monitor controller function (also referred to herein in that capacity as a "cluster controller").

When operating in this manner, MCP clusters can "figure out" the path of a transaction throughout the multiple nodes and/or track a single transaction across multiple nodes.

In addition, an MCP cluster can interact to collect data from all relevant nodes of the cluster and consolidate that data at a single output node, typically, but not necessarily, the MCP cluster controller node.

When an MCP acts as a monitor controller, its main functions are to:
 i) Receive the performance data from all of the nodes (other MCPs) that comprise the application;
 ii) Generate, hold and process the transaction array; and/or
 iii) Issue commands to other MCPs as needed.

An MCP can become a monitor controller statically or dynamically.

If the MCP becomes a monitor controller statically, this will typically occur upon startup of the system. The configuration file would specify that this specific MCP would be the controller. In addition, all other MCPs would be configured with the address of the specific MCP that was designated as the MCP to act as the monitor controller and, as the transaction progresses, all nodes through which it passes would relay their results back to the monitor controller. This configuration would therefore be a form of linear cluster configuration.

Optionally, for redundancy sake a second MCP could be configured as a backup monitor controller MCP. In such a case, the backup MCP would receive copies of the transaction array as the work progresses. A "heartbeat" signal would be established between the monitor controller MCP and its backup MCP such that, if the heartbeat signal, then the backup MCP would become the monitor controller MCP and a command could be issued to the original monitor controller MCP to, for example, cause that MCP to shut down, cause it to restart, or cause it to purely act as a node monitor thereafter. Both the master MCP and the backup MCP can each be on a different node of the system that is executing the application, or on nodes that are external to the nodes executing the application. This configuration would still be considered a linear configuration, albeit a "high availability" one.

An alternative static configuration can be set up such that there is no single MCP monitor controller. Instead, all MCPs are designated as monitor controllers through their respective configuration files at startup. As a transaction flows through a single node the results of the processing (i.e., the transaction array) are broadcast to all nodes in the system in what we refer to as a "one to many broadcast cluster" configuration. Thus all nodes will have a copy of all transactions that were processed through the system. This type of setup can be advantageously deployed in a workload balancing situation, in which case feedback from an MCP would allow for controlling the next node that would be selected for processing, i.e., as the transaction is processing on a node N, the MCP on that node N will know the status of all other nodes on the system, and can thus tell the application which node within the system it should send the transaction to for the next processing step.

If MCPs can become a monitor controller dynamically, this dynamic assignment will typically be implemented such that the MCP on which the transaction starts will initially be the monitor controller and will be assigned that role by the application as the transaction starts. When the transaction is sent to the next node for processing, then the transaction array and MCP monitor control function will also be transferred to the next node. In other words, the MCP monitor controller function progresses along with the transaction from the start node to the end node, and there is only one MCP monitor controller per transaction and, thus, one transaction array per transaction.

Note here that, for a dynamic assignment approach, the implementer must decide how they want to handle the final resulting transaction array and what it indicates. For example, if the final transaction array indicates no performance issues, then is it stored or just discarded. If the final transaction array indicates a performance issue, then will the final MCP initiate some predefined set of events (for example, send an email to the system admin, which would include all the trace data that was collected during the transaction) or would it pass some indication (and or the transaction array or other data/information) to a pre-designated MCP for further action. If an overall "picture" of processing flow for the system is required should the MCP that is the ending monitor controller for that transaction send the transaction array data to another MCP that will act as a collector of transaction arrays and can, for example, merge them all into a single transaction array for further analysis at some point in the future, or should it begin collecting transaction arrays from other MCPs.

Alternatively, where the transaction can result in an endless loop configuration of nodes, the dynamic configuration of an MCP as the monitor controller function can be done such that the MCP on which the transaction starts, or through a startup configuration file, is initially assigned as the monitor controller, with transfer of the monitor control function being dynamically transferred as previously described. However, because of the loop configuration, monitor controller function of the MCP needs to be setup up such that, in the event of any detected performance problem(s), the monitor controller will report such detected problem(s) and send a copy of the transaction array and any associated diagnostic data or information to an MCP that exists outside the loop (an "external" MCP) that will then take over as the monitor controller for purposes of further analysis and decision making. If the looping action is to also continue, in that case, the external MCP can be configured to act as a "super" monitor controller such that, within the loop, the monitor controller function will continue to be passed among the MCPs within the loop but, with respect to the external MCP, all of the MCPs within the loop will merely be acting as node monitors (i.e., the internal MCP commands will be subordinate to any "super" MCP commands.

Thus, as to a loop configuration, the external MCP will have the power to, for example, allow the processing to continue within the loop, stop the loop, remove one or more node(s) from the loop, and/or allow the application to dynamically move parts of its processing to some another available node(s) in a manner analogous to two web servers running in high availability mode such that, if one fails, the other automatically takes over.

Note here that the initial static or dynamic assignment of an MCP at startup need not persist. For some implementations, that assignment may only apply initially and, once the system has started, any MCP within the system can thereafter become the a monitor controller. In other words, the decision process as to what role each MCP plays after initial startup can be dynamically decided, and change, based on the MCP commands stored in MCP text/script files. This is because, the way the system behaves post-start up can be controlled through the MCP commands stored in MCP text/script files commands allowing an MCP to behave differently based on the particular sequence of MCL statements within the MCP text files.

Thus, as should now be appreciated, MCPs are very versatile in that they are easily dynamically reconfigurable into different cooperative clusters as appropriate for the monitoring of particular transactions or transaction types, on a per node basis, and take specific action based on the particular transaction(s) involved.

Figure 5:
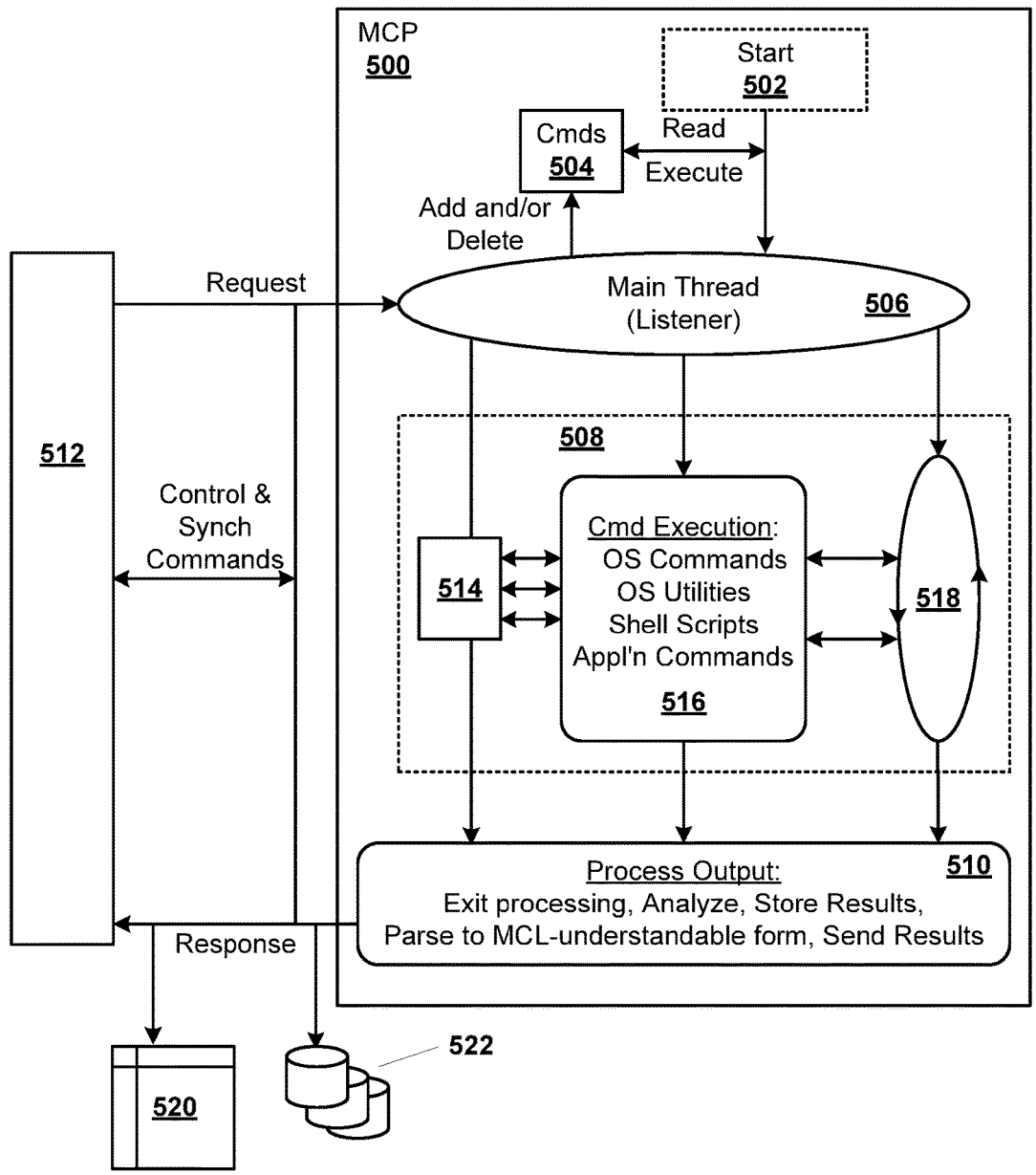
FIG. 5 illustrates, in simplified functional form, the architecture of an example MCP.

FIG. 5 illustrates, in simplified functional form, the architecture of an example MCP 500 which would run on an individual node, for example, each node 102 of FIGS. 1-4. In general, the architecture of an MCP 500 can be described as an extension to the typical server model. As shown, the MCP is made up of a startup configuration file 502, a set of MCL commands 504, a main listener thread 506, command execution 508, and output processing 510. The MCP 500 is configured to receive requests from one or more other MCPs 512, provide responses to one or more other MCPs 512 and exchange control and/or synchronization commands with one or more other MCPs 512 as part of some coordinated activity among a group of MCPs.

The startup configuration file 502 is a command file, stored in storage accessible to the processor(s) where the MCP will run, that has a specific name that is known to the MCP, for example, "startup.cfg" which is automatically retrieved from the storage and executed when the MCP is initiated to, among potentially other things, start a main listener thread 506 that runs throughout the "life" of that MCP 500.

The main listener thread 506 loops and listens for received incoming requests, in the form of one or more MCL commands, from one or more other MCPs 512, typically at least an MCP acting in its capacity as a monitor controller, and executes the request by initiating the command execution 508 function. Depending upon what is received, the command execution function can involve:

i) a single command—Starting a short running thread 514 on the node (which may or may not invoke a stored local system command), for example, run a database query, start/halt a physical system component or system utility or application program, this thread then sends the results to the output processing 510, ii) a sequential list of commands—Directly invokes a stored command file 516, which may invoke one or more local system commands or utilities (vmstat), application commands (db2 reorg), etc.) and then passes the output to the output processing 510, or iii) an iterative Single or Sequential list of commands—Starts a long running thread 518 that can periodically loop, invoke stored command(s), and send results to the output processing 510 (for example, once a second {do "X"} and return {a value} "IF" {something occurs}), or iv) a command file update—Updates an existing command file by adding one or more new commands, deleting one or more existing commands, or replacing an existing command file with a new command file.

Upon receipt of results resulting from one or more of "i)," "ii)," or "iii) from the command execution 508 function, the output processing 510 can cause the command execution 508 to stop (for that relevant action), it can analyze the results received from the command execution 508 function, it can store the results received from the command execution 508 function and/or it can send the results to the MCP(s) that issued the request(s) that caused those results to reach the output processing 510.

In any event, if the results are to be sent to one or more other MCP(s) 512, which may be the MCP acting as the monitor controller or some other MCP(s) that are performing other actions, the output processing 510 will act as a parser to parse the results into a standardized form and/or common MCL structure, for example a transaction array 520 so that they can be understood by whatever is to receive those results.

Once parsed to that common MCL structure, the results are then, for example, sent back to the requestor, sent to the MCP(s) of some other node(s) the requester designated, broadcast to the MCPs making up the cluster, to the MCP acting as a monitor controller, and/or stored in storage 522 locally associated with that node or elsewhere.

As should now be appreciated, this model allows an MCP to act as a "normal" server, have expanded or reduced functionality through the download of one or more new command file(s) or modification of any existing command file(s), and/or communicate and coordinate with other MCPs in a cluster configuration.

In addition, as noted above, the ability of the MCPs to be configured as a monitor controller statically or dynamically advantageously allows the MCPs to be clustered into any type of configuration appropriate for the particular transaction(s) and or system. Moreover, this allows MCP clusters to be dynamically formed and reconfigured as additional nodes enter or leave the system with the control function being dynamically transferable from MCP to MCP as appropriate for the system architecture, transaction flow and monitoring requirements. Thus the MCP structure can readily mimic the universe of nodes that form the physical system.

FIGS. 6A-6D illustrate, in simplified form, simplified examples of the foregoing cluster configurations that can be formed among a group of MCPs 500-1, 500-2, 500-3, ..., 500-*n* running on different nodes to reflect this advantage.

Figure 6A:
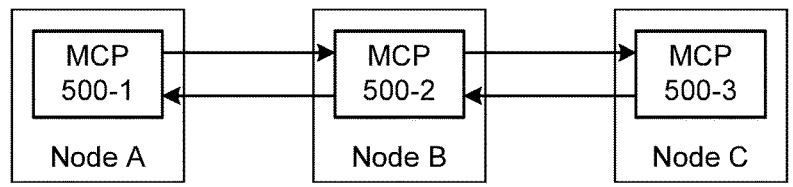
FIGS. 6A-6D illustrate, in simplified form, simplified examples of the foregoing cluster configurations that can be formed among a group of MCPs.

Specifically, FIG. 6A illustrates, in simplified form, a simple example of a statically configured linear cluster of MCPs, in this case involving three MCPs 500-1, 500-2, 500-3, where a single MCP 500-1 is the monitor controller.

Figure 6B:
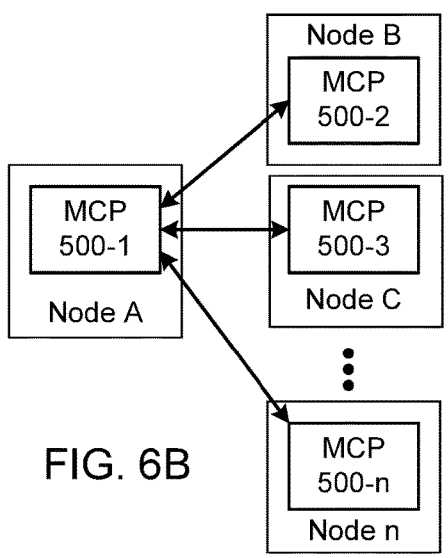

FIG. 6B illustrates, in simplified form, a simple example of a static one to many broadcast cluster configuration of MCPs involving multiple MCPs 500-1, 500-2, 500-3, ..., 500-*n*, where all MCPs are monitor controllers.

Figure 6D:
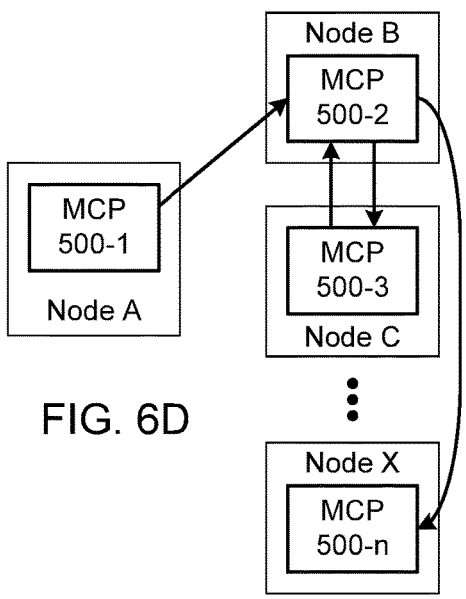
Figure 6C:
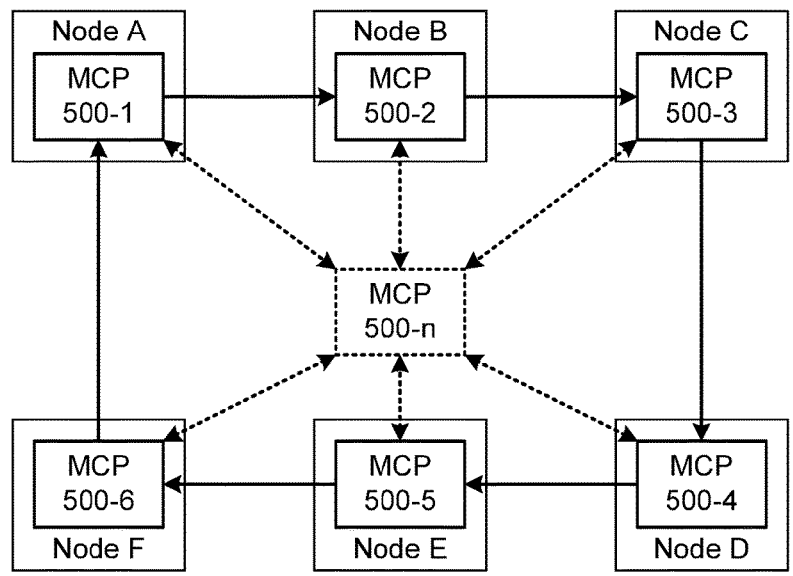

FIG. 6C illustrates, in simplified form, a simple example of a configuration of MCPS where the monitor controller function is dynamic, in this case in a loop configuration as described above involving six MCPs 500-1, 500-2, 500-3, 500-4, 500-5, 500-6 with an additional MCP 500-*n* external to the loop that will act as the monitor controller in the event of a performance problem being located within in the loop.

FIG. 6D illustrates, in simplified form, a simple example of a dynamic cluster configuration of MCPs involving multiple MCPs 500-1, 500-2, 500-3, ..., 500-*n* in which the monitor controller function passes from MCP to MCP as the transaction traverses among the nodes, for example, as the transaction passes from Node A to Node B to Node C back to Node B and ultimately to Node X, the monitor controller function will pass from the MCP 500-1 of Node A to the MCP 500-2 of Node B to the MCP 500-3 of Node C, back to the MCP 500-2 of Node B and then ultimately to the MCP 500-*n* of Node X.

The MCL

As noted above, the MCPs operate under control of the MCL, which is made up of operating system (OS) agnostic "macro" instructions.

Figure 7:
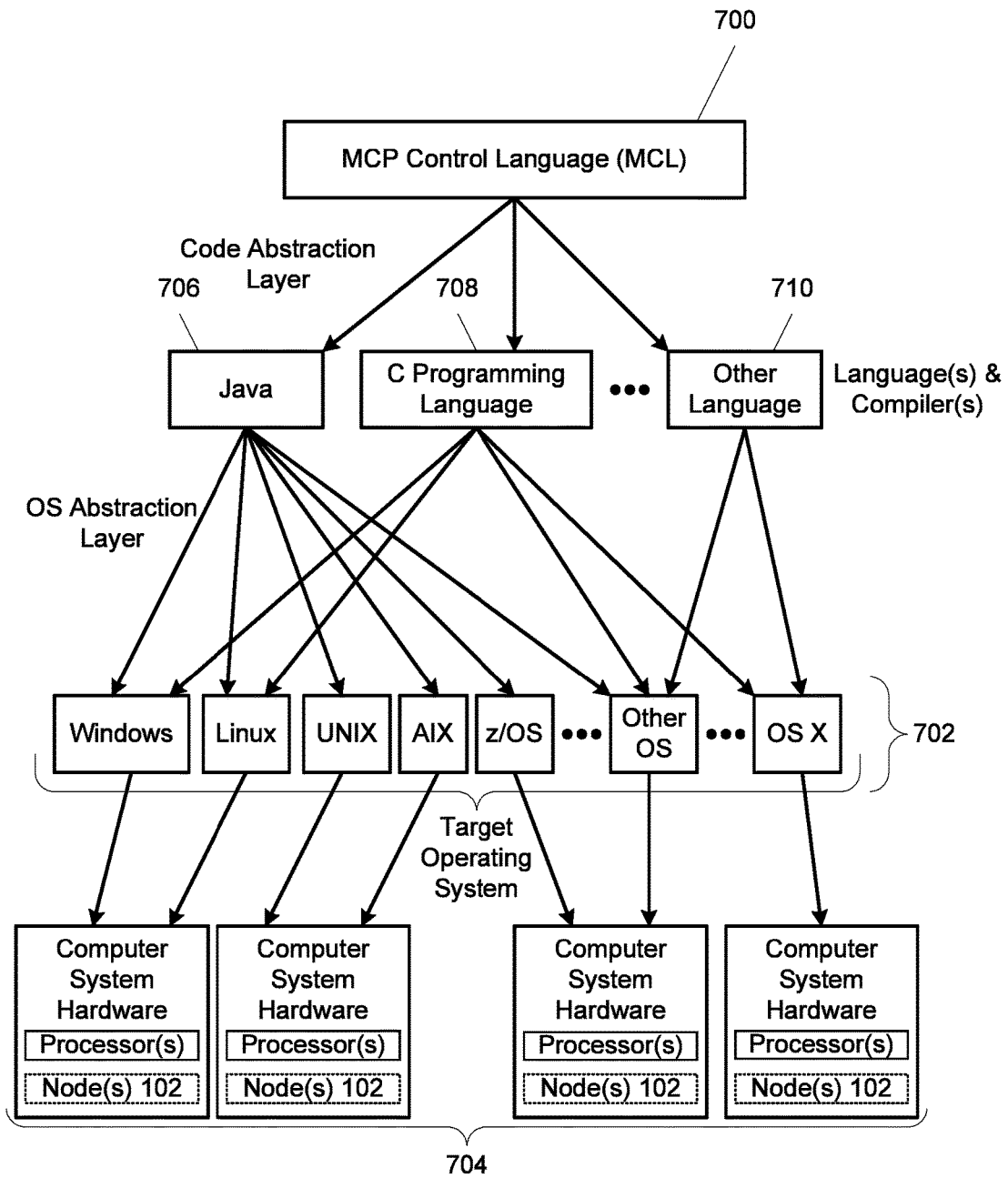
FIG. 7 illustrates, in simplified form, the relationship between the MCL and the underlying operating systems of the computer system hardware and processor(s) with which they may be used.

FIG. 7 illustrates, in simplified form, the relationship between the MCL 700 and the underlying operating systems 702 of the computer system hardware and processor(s) 704 with which they may be used and where the node(s) 102 will run.

As illustrated in FIG. 7, the MCL 700 is isolated from the underlying operating system(s) 702. The MCL can be written in one or more cross-platform languages in order to simplify the development and maintenance process. For example, as shown in FIG. 7, the MCL could be written in Java 706, which would enable the code to be written and compiled once and then could run across multiple operating systems with the operating system that the code is running on being detected at run time. Alternatively, the code could be developed in a language such as the "C" programming language and compiled with an OS-specific compiler. This approach would perform slightly faster, but the code would need to be compiled for each supported operating system. Of course other programming language/compiler(s) 710 could be used if desired, although, as with "C" there will be a tradeoff between higher performance and higher maintenance costs. Thus, it is to be understood that the programming language/compiler selection is an implementation detail, in that no particular programming language or compiler is required because any programming language or compiler will allow for the creation of an OS agnostic MCL that will cause the target computers to do what is required can be used.

In all cases, the receipt of an MCL command by an MCP 500 will cause the receiving MCP 500 to initiate its command execution 508 function with the corresponding invocation of the appropriate operating system/hardware specific command(s) needed to accomplish the action(s) specified by the MCL command.

For purposes of understanding only, the following pseudo-code example illustrates this concept:
GetDir // this is an MCL command to obtain a file list
If OS==Windows
then DIR,
parse DIR result into standard MCL format
If OS==AIX
then LS,
parse LS list into standard MCL format
•
•
•
If OS=={OS identifier}
then {directory list command},
parse {directory list} into standard MCL format
Return MCL formatted result to designated MCP
For purposes of non-limiting illustration only, among the types of commands that can be created are commands such as:
Local "get" commands to:
Get total memory
Get memory used
Get memory available
Get total disk space
Get available disk space
Get used disk space
Get dir list
Get file used space
Get listening ports
Etc.
"Local" commands to:
Return available local resource(s) (e.g., memory, cpu, disk space)
Invoke local utilit(y/ies)
Etc.

Monitoring commands to:
Monitor listening ports
Monitor port x
Monitor data sent
Etc.
Identification commands to:
Self identify {I am: controller, collector, monitor, matrix processor, etc.}
Etc.
"Change" commands:
Change from controller to monitor
Change from monitor to controller
Change to "collector"
Etc.
Connection commands:
Connect to next MCP
Connect to specified MCP
Connect to controller
Connect to collector
Etc.
Send commands"
Send cpu %
Send memory used
Send total memory
Etc.
Application specific commands:
Start {application}
Stop {application}
Start trace ipaddr (next node)
Stop trace ipaddr (next node)
Thus, it should be understood that this approach can be used to create an MCL that is simple and allows for the invocation of a broad and rich set of commands that allow different actions to occur throughout the system in real-time, but only as needed or appropriate.

Transaction(s)

As noted above, transactions, by definition, span one or more nodes, have a beginning and an end, at the individual level have a response time (time that it takes for the transaction to complete) and at the group level have a throughput (number of transactions executed per unit time). Events that occur through the lifetime of the transaction affect both the response time and the throughput. A transaction originates (is always born) on one of the nodes. Advantageously, with our solution, each node contains an MCP 500, so when a transaction originates on a node, the MCP on that node becomes aware of that transaction's origination and (individually or in conjunction with other MCPs) can now keep track of the requests sent and processed by that transaction as it moves from node to node.

Note now that, as used in the description that follows, the term "instrumented" means that the application, subsystem or operating system that initiates a transaction (referred to here as the calling code) is enabled to communicate with a monitor controller MCP. The "instrumentation" is accomplished in one of two ways: either the MCP deployed at the node in the form of a library, static or runtime, that is linked into the calling code, or the MCP is in the form of an executable that receives commands/updates from the calling code via an interface, for example TCP/IP.

Identifying the origination/birth of a transaction and it's execution across the various nodes can be accomplished using one or more of the methods listed below. For purposes of understanding, the list is sorted in "software stack" order with the "topmost" level listed first.

The Application Level: at this level the application is instrumented such that it "informs" the MCP acting as the monitor controller that a transaction has occurred. Specifically, when a transaction is "born" the application notifies the monitor controller MCP of the event and provides other information such as a transaction name, transaction ID, the transaction purpose (store data, retrieve data . . . ), the next destination . . . etc. As the transaction moves from node to node the application running on each node sends the transaction information to the pertinent monitor controller MCP.

The Subsystem Level: at this level a subsystem that is used by multiple applications would inform the monitor controller MCP of its transaction's progress. For example, a database program would send the monitor controller MCP information about all the SQL queries it received and the execution time for each one. Similarly, TCP could update the monitor controller MCP with network send/receive request (ex. TCP/IP) information.

The Operating System/Kernel Level: at this level an Operating System component would inform the monitor controller MCP of the transaction's progress. For example, a disk drive or a network driver would inform the monitor controller MPC of each read or write that occurred and the timing for that operation.

In general, only when a "poorly performing" or "bad" transaction is identified, is further targeted diagnostic information gathering triggered by an MCP. Thus, our solution causes activation of lower levels of transaction monitoring or system/subsystem/device diagnostics, generally only when a problem is identified at a higher level, and then, typically, only for the specific "poorly performing" or "bad" transaction. As a result, at the lowest level monitored by the MCP, the exact source of the slowdown can be identified and full tracing (or diagnostics) can be activated for that single component, typically only for the duration of that transaction or transaction type. In this manner, the targeted diagnostic data gathering uses minimal system resources, resulting in minimal to no latency effects, and thus allows for use in production systems to locate and/or diagnose issues, in contrast to traditional latency-inducing production approaches and test environment approaches.

For purposes of understanding, some examples involving our solution will now be described.

In one example of an implementation, all three levels, as identified above (i.e., Application Level, Subsystem Level, Operating System/Kernel Level), within the system would be instrumented to communicate directly with a monitor controller MCP 500.

Now presume, for example, that an application makes 1 million requests/transactions per day and for 20 of these requests/transactions the response time exceeds the specified service level agreement (SLA).

Due to our solution, the application level which is executing on all the nodes would be continuously providing the relevant MCP's with transaction status as the transactions are processed from node to node. The transaction status (i.e., results in terms of relevant information and/or parameters) will be forwarded, and/or consolidated, as a transaction array (which includes information about each step within the transaction) at the monitor controller MCP within each cluster. The monitor controller MCP will then analyze the transaction array and identify that, for example, 20 requests are "occasionally" slow to execute. The monitor controller MCP further determines that these 20 "slow" requests are slow on the section of the transaction that is executing on node "N" and that the slowness occurs when the application is trying to store data to a specific storage subsystem. As a result, the monitor controller MCP will send an MCL command to the MCP for the node of the storage subsystem to start gathering more data. The MCP of the node on the storage subsystem will then start/activate the subsystem level of monitoring (e.g., data collection) and report the results back the monitor controller MCP.

The next time a slowdown occurs at the storage subsystem the MCP will be able to determine that a write to a specific device (for example, a particular disk drive) is the source of the slowdown. Based upon that the monitor controller will cause the MCP of the storage subsystem node to trigger a full set of diagnostics traces to be run against the specified device.

Via these diagnostics, the MCP of the storage subsystem node can determine what type of error (hardware, software, etc.) is occurring on the device.

The results are sent from the storage system node MCP back to the monitor controller MCP.

Since the transaction level tracing enables targeted low level diagnostics to be run only against the device in the system that may be causing the occasional performance slowdown, other system components, nodes or the production environment as a whole will not be adversely impacted and the least amount of system resources will be used to diagnose the issue.

In another example implementation, only the Application level code is instrumented to communicate directly with a monitor controller MCP. Again, presume for this example that an application makes 1 million requests per day and, for 20 of these requests, the response time exceeds the specified SLA.

With this example, the application level which is executing on all the nodes would be continuously providing the local MCPs with the transaction status as it is processed from node to node. This status information will then be forwarded to the relevant monitor controller MCP.

The monitor controller MCP will then analyze the transaction array (which includes information about each step within the transaction) and identify the 20 requests that are occasionally "slow" to execute. Again, presume that these 20 requests are "slow" on the section of the transaction that is executing on node N and that this slowness occurs when the application is trying to store data to a specific storage subsystem.

As a result, the MCP causes the subsystem level diagnostics to be started/activated on the storage Subsystem (which may involve an MCP of a different node if the storage subsystem is not on the same node as the monitor controller MCP) and the source of the problem would then be identified in a manner similar to the preceding example.

As should be appreciated, this example would utilize more system resources than the previous example, since the diagnostics to be run are directly triggered at the subsystem level. Nevertheless, since this occurs only on the "problem node" the resources consumed, although greater than with the previous example, are still minimal compared to running diagnostics across all nodes (which could number in the thousands). Thus, even though the transaction level tracing will cause greater resource usage, running the diagnostics only against the node that may be causing the occasional performance slowdown will likely adversely impact that node, but it will not adversely impact any other nodes or the overall production environment.

In general, different instrumentations will have different impacts on the systems throughput. Specifically, instrumenting the system at all three levels would utilize the least system resources. Since the diagnostics will only run against the component that causes the performance degradation. Whereas, instrumenting only the application layer would provide more impact on the system resources, since the diagnostics will run at a subsystem level on a specific node. Even so, this impact would be minimal compared to running a diagnostic trace across all systems/nodes.

As more instrumentation is provided, more precise identification of the problem area can be obtained because diagnostic trace code will be run to target a specific device and thereby minimize the impact on the entire system.

Transaction Array(s)

As mentioned previously, the result of the operation of the MCPs is creation of one or more transaction arrays. The details regarding transaction array content will now be provided.

In connection with creation and use of the transaction array, the MCL will typically include multiple transaction array specific commands, for example:

Create Transaction Array {uniqueArrayName}—which, as indicated, could be the command that causes creation and initialization of a new transaction array having the identified "{uniqueArrayName}";

Send transaction array rows—which could be the command used to cause an MCP to send its transaction array content to another MCP that will aggregate transaction array content from multiple nodes;

Receive transaction array rows—which could be the command used to cause an MCP to receive and aggregate transaction array content from the MCPs of multiple nodes;

Append to transaction array—which would append collected data to an existing transaction array;

SortArrayBy—which could be used to cause a sorting of the transaction array detail according to one (or more) of the collected parameters, for example, NodeID, Elapsed time, TransactionID, etc.

Thus, it should be appreciated that individual implementations can create commands appropriate to the situation, the foregoing being merely exemplary of this aspect of our solution.

Depending on the implementation, transaction arrays can be created at any one or more of the:

Transaction level—with typically one array for each transaction;

Node level—with typically one array for each node, containing information for all transactions that traverse that node; and/or System level—with typically one array for all transactions running on the system (i.e., the entire collection of nodes), such that all of the transaction level detail can be analyzed at either the transaction, node or system level.

A transaction array contains information about transactions as those transactions progress through the nodes of the system, on a transaction and node basis. In general, the transaction array is a data structure that, for example, is configured as a true array, although it can be configured in any other type of arrangement, the particular internal configuration being an implementation detail provided the relevant information is contained therein. For purposes of explanation only, the transaction array will be described using the true array structure, with each row representing the details of an individual transaction for an individual node. Of course, it should be understood that, alternatively (although a less conventional way to fill an array), each column could contain that information instead.

For purposes of this example, each row in the transaction array would contain data such as, for example:

Transaction Information,
Transaction Name,
Transaction ID,
Start Timestamp,
End Timestamp,
System Parameters,
CPU used,
Received bytes,
Transmitted bytes,
Disk IO rate,
Memory used,
System Information,
SystemIP Address, and
System Name.

Note that any quantity and type of data can be stored in each row of the transaction array as appropriate for the implementer's (and system) requirements. The key to the content of the transaction array is to allow one to identify the progress of each transaction through each of the nodes of the system. As a result, at a minimum, some form of nodeID, transactionID and transaction performance data on each node needs to be collected.

Each row in a transaction array is generated by the MCP located on the nodes which were involved in processing the transaction.

As discussed above, after the MCPs individually generate transaction array rows for transactions they receive, they transmit the rows to the requested destination(s). As noted previously, the requested destination(s) can be static or dynamically generated (based on the system architecture and requirements). Thus, the requested destination could be the next MCP in the transaction chain. In this case the transaction array row for a node would be transmitted along with the transaction as it progresses through the nodes, and depending upon the implementation, each successive node could append their transaction array row to the existing transaction array being passed or they could be sent as individual pieces of the array from each node and at the final node, all of the pieces of the array could be assembled into the final transaction array for the transaction. In either case, this would allow for the transaction array (as a whole or in its constituent pieces) to be processed by the final node in the transaction chain.

Alternatively, a specified designated "transaction array assembler" (an MCP acting as a monitor controller MCP and could be a any node that is part of the system, or a node that is external to the system) has the sole role of monitoring transaction process. The transaction array assembler would receive pieces of the transaction array sent as the transaction leaves the nodes and assemble the transaction array from the received pieces. This approach would typically be used to monitor the progress of transactions across the system in real time.

Another alternative approach would use the originating node for the transaction to create the transaction array. This would result in a multi-nodal transaction trace file being created on the originating transaction node. Thus, with this approach, it becomes possible to trace, not only the throughput and response time of the overall transaction, but also the response time and throughput of the transaction on each node throughout its processing lifetime.

In addition to, or in lieu of any of the above options, each MCP could be instructed to locally store the rows it creates in storage in, or associated with, the node on which it is running. This approach would allow for a more detailed analysis of that node's performance, through coupling that information with any System or Application level data that is also being collected.

FIG. 8 illustrates, in simplified form, an example of a portion of a transaction table 800 that might be available from a monitor controller MCP 500 of a system 100 relating to the progress of three transactions, showing each transaction's progress across the nodes they traversed. As shown, the transaction table 800 is sorted by TransactionID so one can easily see the progress of each of the first three transaction as they executed across the different nodes.

For example, as shown in FIG. 8, the transaction with TransactionID "Tran01" passed through seven nodes from start to finish, beginning at Node01 then moving through Node02 and Node03 before reaching Node04 and then being returned in a reverse route back to Node01, whereas the transaction "Tran02" also began at Node01 then moved through Node02 and Node03 before returning directly from Node03 to Node01.

This breakdown allows for the identification, for example, of the CPU usage breakdown across the nodes, for example, as shown in the column labeled "CPU (msec)" Thus, by programmatically examining the duration of each transaction type, for example "archive", across all nodes and transactions one can immediately identify that there is a potential intermittent performance problem with, for example, Node04 and, in accordance with the specific instrumentation of this implementation, take further more detailed action as described herein.

In addition, note that the transaction array 800 of FIG. 8 is not limited to containing measured values, some implementations can also include calculated columns, such as the elapsed time between the start and end of each transaction. Using the elapsed time and the CPU time another calculated column can be added, the network transmission time. Thus, it should be understood that the actual number and type of data values collected per row and the inclusion of any additional calculated values are implementation dependent.

A further advantage provided by use of the transaction array tables is that they can be sorted, ideally by any column. An example of this is shown in FIG. 9, which illustrates the transaction table 800 of FIG. 8 after it has been sorted by NodeID as the primary sort field and time as the secondary sort field. As can now be seen in FIG. 9, by sorting the transaction array 800 on the nodeID and time columns, one can now identify all the transactions that are occurring concurrently on each of the nodes. From this, one can now readily determine if transaction concurrency is leading to slower performance, or if the slower performance is independent of the concurrency, i.e., it is the result of some system characteristic. Data collected at the node level and/or the application level can then be used to further analyze and isolate the source of the performance issue.

Thus, based upon the foregoing, it should now be appreciated that implementations of our solution provides numerous advantages and is a significant improvement to multinode, multi-tiered distributed computer systems in general, and to transaction processing in such systems in particular, including that deployed implementations of our solution provide an advantage in that they allow for monitoring the transactions within the system on a transaction by transaction basis, regardless of the number of nodes on which the transaction executed; deployed implementations of our solution provide a further advantage in that they allow for faster identification of the problematic node(s) for a "poor performing" transaction and within the production environment; and deployed implementations of our solution provide an additional advantage in that they allow for faster identification of the cause of the transaction degradation on a node (e.g., lack of CPU, memory, I/O, etc.).

Moreover, since the exact time and cause of the transaction degradation can be known through deployed implementations of our solution, this information can easily be used to trigger the targeted collection of pertinent node(s) and application(s) status information, in order to understand the underlying cause(s) of the performance degradation.

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A method performed in a computer system including multiple communicatively interconnected computers and non-transient storage accessible by at least one of the computers, each of the computers including an operating system and at least one processor, the method comprising:
   a) starting multiple nodes on one or more of the multiple communicatively interconnected computers, the nodes being defined by instructions encoded in the non-transient storage and executable by the processors;
   b) executing production workloads, made up of transactions, using the processors of the multiple communicatively interconnected computers;
   c) running a Monitoring and Control Program (MCP) on each node, each MCP being defined by instructions encoded in non-transient storage and executable by the processors of each node concurrently with the execution of the production workloads, wherein each MCP is communicatively interconnected to at least one other MCP and at least one of the MCPs acts as a controlling MCP;
   d) communicating, operating system-independent MCP control language commands to other MCPs using the controlling MCP to cause the other MCPs to monitor execution of each of the transactions of the production workloads, on a per-transaction basis, as they traverse nodes;
   e) monitoring in real-time, via each MCP, individual transaction execution, the monitoring involving collecting parametric information regarding the execution of the transactions across the nodes on a node and transaction basis, the parametric information comprising at least an identification of each specific transaction, each node involved in processing those specific transactions, and at least one timing value related to the processing of each specific transaction by involved nodes;
   f) generating a transaction table including the collected parametric information;
   g) storing the transaction table in the non-transient storage;
   h) identifying, from the parametric information in the transaction table, whether there is degraded performance within the computer system, based upon throughput per unit time for all individual transactions progressing across individual nodes within the computer system; and
   i) when degraded performance is identified, running, under MCP control, lower level analysis only for particular nodes and particular transactions associated with the degraded performance.

* * * * *